United States Patent [19]

Aloi et al.

[11] 4,392,484
[45] Jul. 12, 1983

[54] BUILT-IN SOLAR PANEL

[76] Inventors: Michael J. Aloi, 1743 S. Tuxedo; Kevin J. Hancock, II, 8713 Los Olivas Ct., both of Stockton, Calif. 95204

[21] Appl. No.: 273,287

[22] Filed: Jun. 15, 1981

Related U.S. Application Data

[62] Division of Ser. No. 102,616, Dec. 11, 1979, Pat. No. 4,273,108.

[51] Int. Cl.³ .............................................. F24J 3/02
[52] U.S. Cl. ..................................... 126/450; 52/200
[58] Field of Search ....................... 126/417, 418, 450; 52/200; 165/67, 68, 168, 172, 175

[56] References Cited

U.S. PATENT DOCUMENTS

| | | | |
|---|---|---|---|
| 4,015,586 | 4/1977 | Vroom et al. | 126/450 |
| 4,055,163 | 10/1977 | Costello et al. | 126/450 |
| 4,076,026 | 2/1978 | Copping | 126/448 |
| 4,082,080 | 4/1978 | Pittinger | 126/452 |
| 4,083,360 | 4/1978 | Courvoisier | 126/450 |
| 4,086,912 | 5/1978 | Freeman | 126/450 |
| 4,134,544 | 1/1979 | Thomason et al. | 126/428 |
| 4,141,339 | 2/1979 | Weinstein | 126/450 |
| 4,144,874 | 3/1979 | Zebuhr | 126/450 |
| 4,148,296 | 4/1979 | Parlato | 52/200 |
| 4,194,498 | 3/1980 | Mayerovitch | 52/200 |
| 4,228,791 | 10/1980 | Hirai | 126/450 |
| 4,282,860 | 8/1981 | Koizumi | 126/450 |
| 4,284,064 | 8/1981 | Midouhas | 126/450 |
| 4,289,117 | 9/1981 | Butcher | 126/450 |
| 4,305,384 | 12/1981 | Proven | 126/450 |
| 4,314,544 | 2/1982 | Muller | 126/450 |

*Primary Examiner*—Daniel J. O'Connor
*Attorney, Agent, or Firm*—Blair, Brown & Kreten

[57] ABSTRACT

Disclosed herein is a solar panel assembly and method for fabrication of same including cutting away a portion of the rafters and roof sheeting to provide an orifice of suitable dimension within which a solar panel frame is to be disposed, providing a step portion on an upper inner periphery thereof, disposing a frame lower portion upon the step, installing conduits extending through the solar panel frame at upper and lower portions thereof in a substantially horizontal direction, interconnecting these conduits with a tubed collector plate, providing an insulative layer underneath this tubed plate, placing a transparent panel on top of the frame lower portion, and overlying the panel with a frame upper portion which connects the solar panel frame and the frame lower portion by suitable fasteners. Appropriate weather stripping is deployed between the frame upper portion and the solar panel frame, and the open area that exists between the solar panel frame and the roof is provided with a flashing so as to complete the sealing arrangement.

4 Claims, 21 Drawing Figures

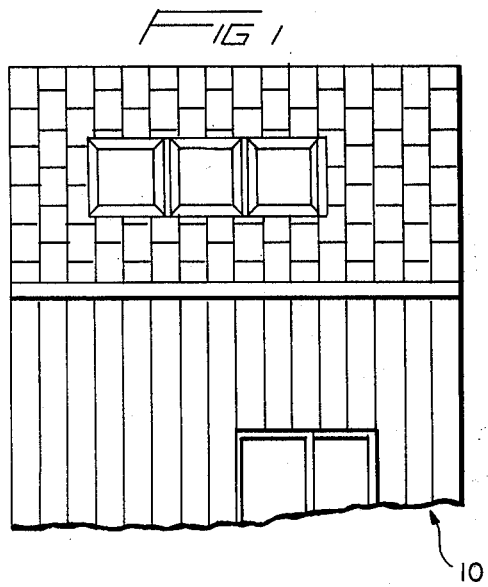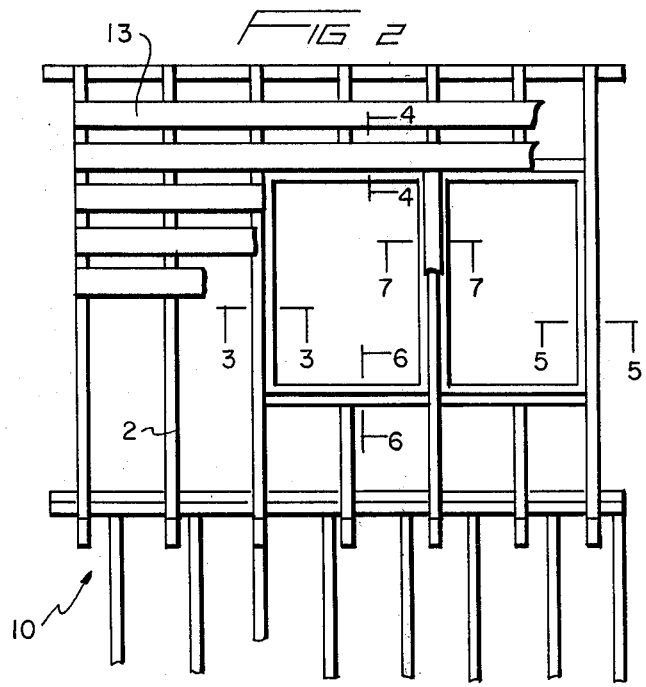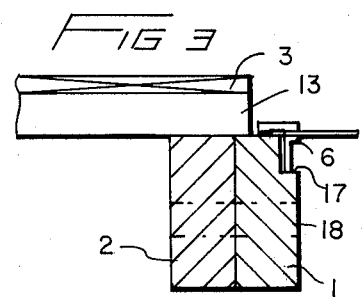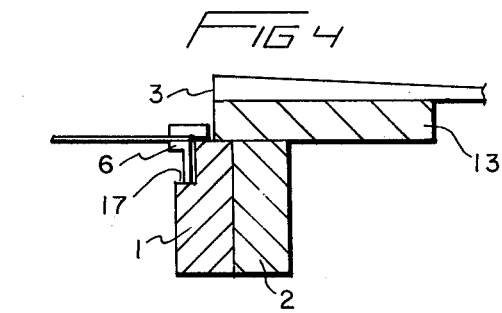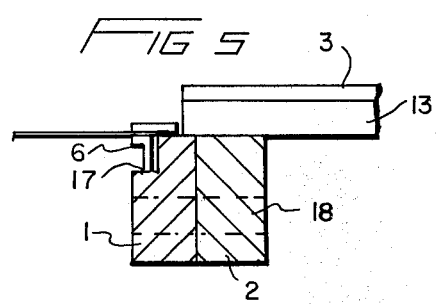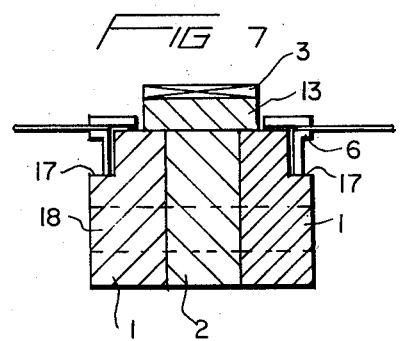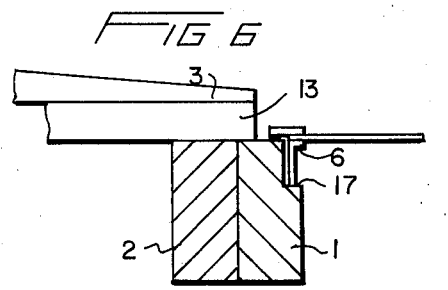

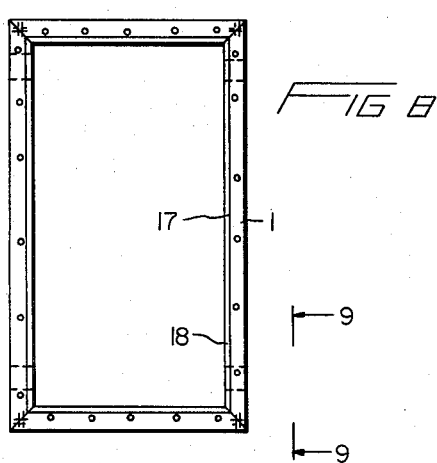
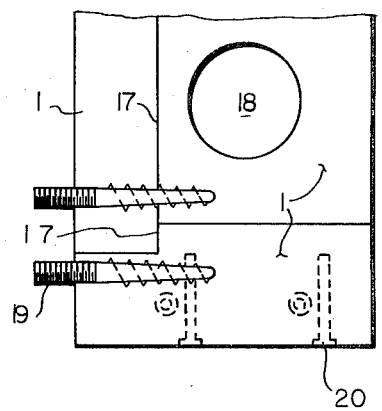
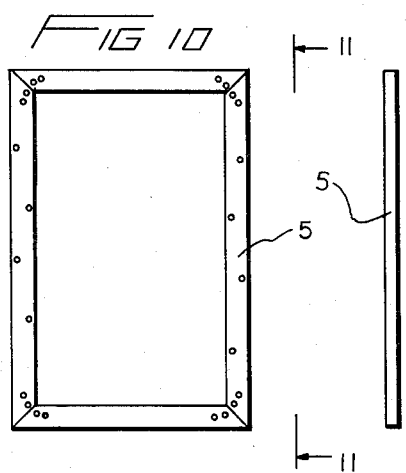
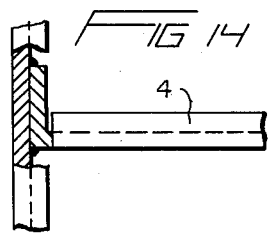
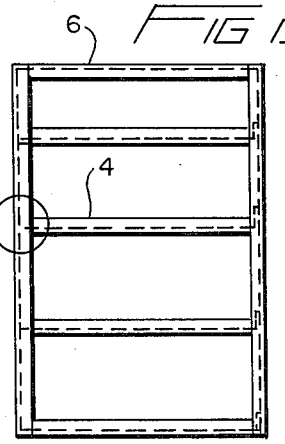
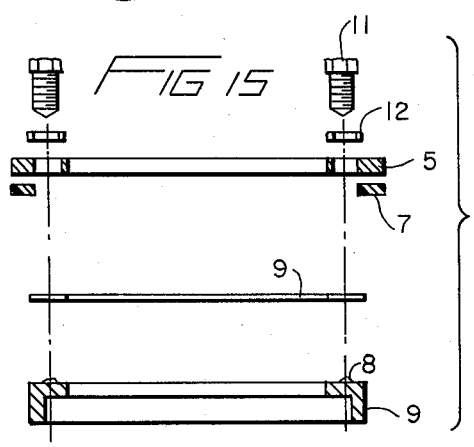
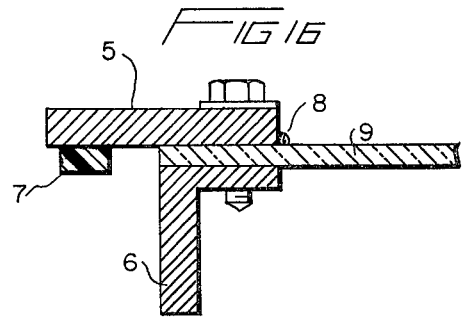

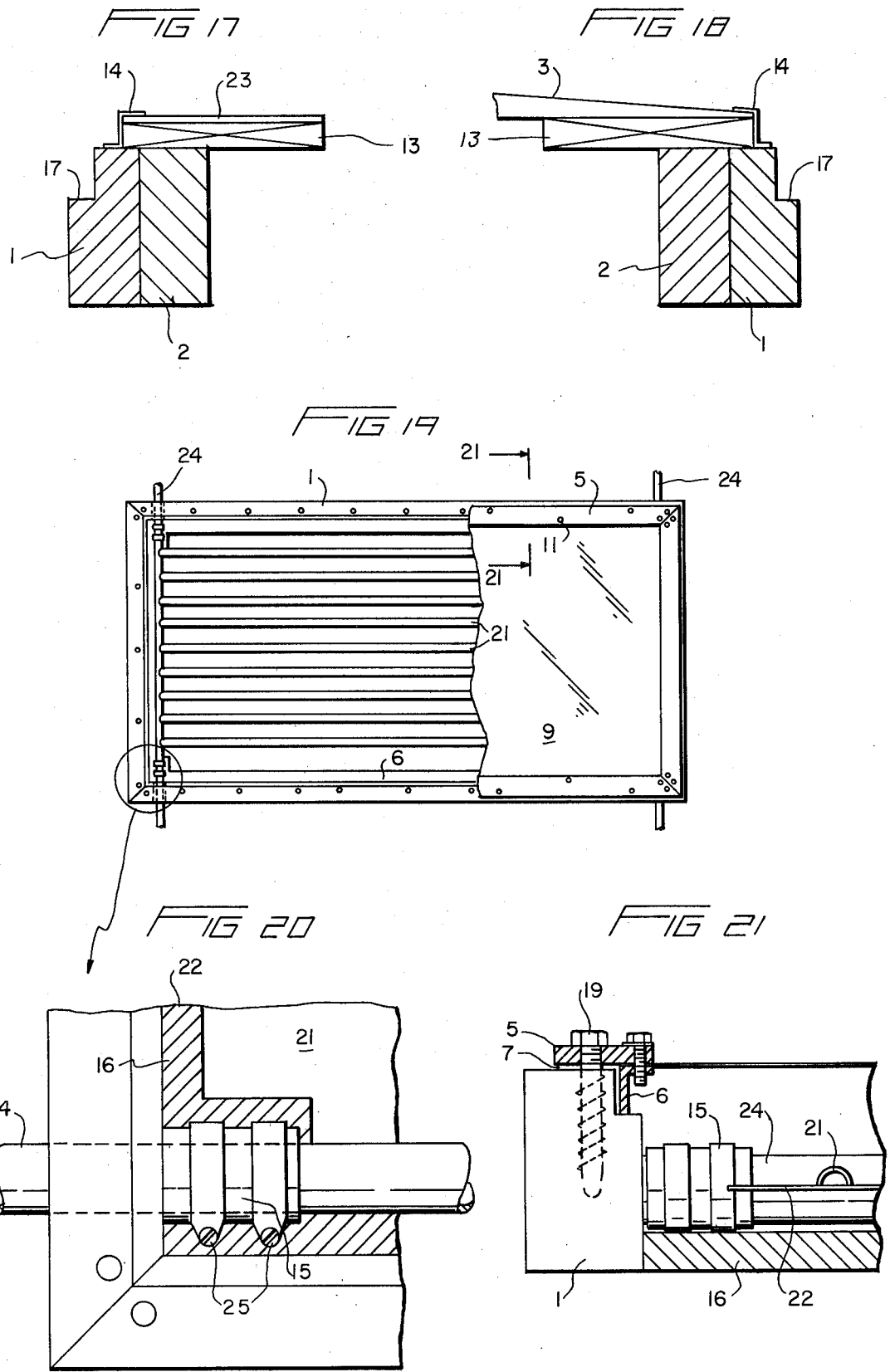

BUILT-IN SOLAR PANEL

This application is a division of application Ser. No. 102,616, filed Dec. 11, 1979, now U.S. Pat. No. 4,273,108.

BACKGROUND OF THE INVENTION

The necessity to conserve energy is a point which does not need to be belabored here. However it is extremely important and useful to be provided with a solar water heating device which comes in a substantially standardized form so as to reduce the initial fabrication charges for the device, and provide these components in such a manner that the installation process is neither onerous nor incapable of being updated should a breakthrough in the technology occur which makes economic sense.

Various devices exist in the prior art which attempt to address themselves to these goals, and the state of the art of which applicant is aware comprises the following patents:

U.S. Pat. Nos. 4,055,163 Costello et al; 4,086,912 Freeman; 4,082,080 Pittinger; 4,076,026 Copping; 4,134,544 Thomason et al; 4,144,874 Zebuhr.

None of these references contemplate nor render obvious that which is taught and claimed in the instant application, since the patents to Copping and Zebuhr neither suggest nor specify the step portion which is an integral part of the instant application.

Similarly, the patents to Costello et al and to Pittinger do not fall within the purview of the instant application since the former patent neither contemplates nor renders obvious the concept of non-linear tubes for use with the heat transfer that takes place upon solar radiation, and the latter does not provide tube means within the fair scope and spirit and meaning of the instant application.

Similarly, Freeman neither suggests nor contemplates a lower frame portion similar to the instant application that has an L-shaped configuration or cross-section for purposes to be described herein after and Thomason et al is not directed to the mechanics of a solar heat transfer device per se, but rather is more interested in the control system therefor.

SUMMARY OF THE INVENTION

Accordingly, an object of this invention is to provide an apparatus and method for installing the apparatus which combines novel structural methods and details when contrasted with the prior art.

Further, it is an object of this invention to provide a device of the character described which is relatively easy to install, and can be most beneficially made of modular design so as to benefit from breakthroughs in solar technology at a minimum expense.

A further object contemplates providing a device of the character described above which is durable in construction, is of standardized form so as to reduce the initial cost for the installation thereof, and reliable in use.

In this regard, a novel connection system between the solar frame and the heat exchange area as it affects the conduits is provided so that high pressure and temperature can be withstood while at the same time allowing for an easy disassembly thereof.

It is a further object to provide a device of the character described above which when installed is of tight construction so that neither leaking nor heat loss through the system is possible.

It is still a further object of this invention to provide a panel of the character described above which does not weaken the structural integrity of the building upon which it is installed, but rather rigidifies to a greater extent the roof structure thereof.

These and other objects will be made manifest when considering the following detailed specification when taken in light of the appended drawings.

BRIEF DESCRIPTION OF THE DRAWINGS

FIG. 1 is a side view of a portion of a building carrying the invention according to the present application.

FIG. 2 is a skeletal view of the device shown in FIG. 1.

FIG. 3 is a sectional view along lines 3—3 of FIG. 2.

FIG. 4 is a sectional view taken along lines 4—4 of FIG. 2.

FIG. 5 is a sectional view taken along lines 5—5 of FIG. 2.

FIG. 6 is a sectional view taken along lines 6—6 of FIG. 2.

FIG. 7 is a sectional view taken along lines 7—7 of FIG. 2.

FIG. 8 is a top plan view of the solar panel frame according to the present invention.

FIG. 9 is an end view of a portion of that which is shown in FIG. 8 indicated by lines 9—9.

FIG. 10 is a top plan view of the frame upper portion according to the present invention.

FIG. 11 is an end view of that which is shown in FIG. 10.

FIG. 12 shows the crossbar of FIG. 14 in a bent position.

FIG. 13 is a top plan view of the frame lower portion according to the present invention.

FIG. 14 is a detail of a juncture of that which is shown in FIG. 13.

FIG. 15 is an exploded parts view of the fastening details between the upper and lower frame portions.

FIG. 16 is a detailed view of a section of that which is shown in FIG. 15.

FIG. 17 is an alternative view to that which is shown in FIG. 4 including flashing.

FIG. 18 is a view similar to FIG. 6 showing a similar detail as to that shown in FIG. 17.

FIG. 19 is a top plan view with a portion cutaway of the apparatus removed from the house.

FIG. 20 is an exploded view of a corner shown in FIG. 19.

FIG. 21 is a sectional view taken along lines 21—21 of FIG. 19.

BRIEF DESCRIPTION OF THE PREFERRED EMBODIMENT

Referring to the drawings now wherein like reference numerals refer to like parts throughout the several drawing figures, reference numeral 10 is directed to the solar heating system according to the present invention. The system 10 may generally be regarded as being provided with a substantially rectangular solar panel frame 1 placed within a cutaway area of roof rafters 2 and roof sheeting 13 (with of course the roofing material such as shingles 3 or tar paper 23 having been cut away).

The solar panel frame 1 can generally be regarded as having a rectangular construction in a preferred form in which an upper inner periphery thereof defines a step portion 17 for purposes to be assigned. As shown in FIGS. 3-7, the solar panel frame 1 is secured to the roof rafters by any suitable technique, and pipe openings 18 are provided for conduit means to be defined herein after.

Disposed on the step portion 17 there is provided a lower frame portion 6 having a substantially inverted L-shaped configuration which runs around the inner periphery of the step portion as shown and is affixed thereto by any suitable means. Overlying this frame lower portion 6 is a transparent panel 9 made preferably of lexan or its equivalent, and the panel 9 is affixed to the lower frame portion 6 by means of an upper frame portion 5. The upper frame portion 5 is defined by a substantially rectangular grid having parallel and planar upper and bottom faces and as shown in FIG. 16 for example is affixed to the lower frame portion as by a screw 11 provided with a rubber washer 12. A sealing bead 8 is provided around a top inner periphery that exists between the upper frame portion and the panel so as to provide a water tight seal. A portion of the upper frame overlies the solar panel frame 1 and weatherstripping 7 is disposed there between for a similar beneficial water-tight construction. The upper frame portion can be affixed to the solar panel frame 1 by means of hanger bolts 19 as shown in the drawings.

The lower frame portion can be inter-braced between parallel spaced opposed sides thereof by means of cross-braces 4 as shown in FIG. 13, and it is to be noted that these cross-braces are provided with orthogonally offset terminal portions which can be welded to the frame lower portion 6 as shown in FIG. 14. This of course provides additional rigidification.

As shown in FIG. 8, holes 18 are provided at upper and lower extremities of the solar panel frame 1, and FIG. 9 details an end view thereof wherein the juncture between one side and the next has been depicted. Hanger bolts 19 are provided to fasten components in registry, and this is further assisted and aided by nails 20 as shown in this drawing.

The beneficial heat transfer takes place by providing these upper and lower conduits 24 in which they are vertically off-set, but horizontally disposed as by on an angle roof, and inter-connect the upper and lower conduits 24 by means of plural substantially parallel spaced tubes 21 disposed on a collector plate. Underlying the tubed collector plate 21 there is provided in a preferred form insulation 16 having a top face thereof provided with a reflective foil backing 22 so that any heat and radiation falling thereon is an intersifier upon the collector plate 21. The conduits 24 are connected from an outer portion of the solar panel frame to an inner portion by means of a rubber hose coupler 15 or any suitable connection device which can withstand high pressure and temperature since that is likely to occur in this system, and fastening clamps 25 are provided to secure the inner portion of the conduit 24 with the outer portion at the juncture.

FIGS. 17 and 18 reveal that the periphery of the roof that surrounds immediately the solar panel should be provided with a flashing 14 preferably made from sheet metal so as to seal this juncture in ambient conditions.

Having thus described this invention, it should be apparent that the preferred method for installing this panel would comprise the steps of cutting the rafters and sheeting to provide an opening substantially the dimensions of the panel, affixing a solar panel frame to the rafters as by nailing, providing a step portion on an upper inner periphery of the panel frame so as to serve as the support for the lower frame portion which is placed thereon, overlying this lower frame portion with a transparent panel and securing the lower panel portion with the upper panel frame portion and the solar panel frame by suitable fasteners, and assuring that no leakage can occur there between by appropriate seals and weatherstripping gaskets. Prior to this however, of course, the conduit system is placed within the solar panel frame by adjoining the outer portion of the conduit 24 with the inner portion of the conduit by means of the coupling 15 and underlying the collector plate 21 with an insulative material preferably having a reflective top facing. The cross-braces can be applied to the lower frame portion as by welding or bolting together as desired, and corners between these frame elements are suitably fastened as by hanger bolts or nails as shown and previously described. Finally, the flashing is applied to the cutaway area at the juncture with the solar panel frame for the benefits described herein above.

Having thus described the invention, it should be apparent that numerous structural modifications are contemplated as being a part of this device as described herein above and as delineated herein below by the claims.

What is claimed is:

1. A method of installing a solar panel comprising cutting rafters and sheeting to provide an opening substantially the dimensions of the panel, affixing a panel frame to the rafters, providing a step portion on an upper inner periphery of the panel frame, providing upper and lower conduits within the frame and interconnecting the conduits with tubes, deploying a frame lower portion on the step portion, placing a transparent panel thereover and affixing an upper frame portion thereto.

2. The method of claim 1 including placing weatherstripping between the upper frame portion and the solar panel frame.

3. The method of claim 2 including placing an insulating material below the collector plate.

4. The method of claim 3 including placing flashing where the solar panel frame abuts the cutout portion of the roof.

* * * * *